(12) United States Patent
Wu

(10) Patent No.: US 8,963,578 B2
(45) Date of Patent: Feb. 24, 2015

(54) RECEIVER

(71) Applicant: NOVATEK Microelectronics Corp., Hsin-Chu (TW)

(72) Inventor: Tse-Hung Wu, New Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 13/949,193

(22) Filed: Jul. 23, 2013

(65) Prior Publication Data
US 2014/0029702 A1    Jan. 30, 2014

(30) Foreign Application Priority Data

Jul. 24, 2012  (TW) .............................. 101126591 A

(51) Int. Cl.
*H03K 17/16* (2006.01)
*H04L 25/12* (2006.01)
*H04L 25/02* (2006.01)

(52) U.S. Cl.
CPC ............ *H04L 25/12* (2013.01); *H04L 25/0278* (2013.01); *H04L 25/0292* (2013.01)
USPC ............................................. 326/30; 326/26

(58) Field of Classification Search
USPC .................................... 326/21, 22, 26, 30, 82
See application file for complete search history.

(56) References Cited

U.S. PATENT DOCUMENTS

| | | | |
|---|---|---|---|
| 7,719,309 B2 * | 5/2010 | Santurkar et al. ............... | 326/30 |
| 7,928,757 B2 * | 4/2011 | Nguyen et al. .................. | 326/30 |
| 8,487,650 B2 * | 7/2013 | Fazeel et al. .................... | 326/30 |
| 2012/0182044 A1 * | 7/2012 | Oh .................................. | 326/30 |
| 2012/0256654 A1 * | 10/2012 | Cho ................................ | 326/30 |

FOREIGN PATENT DOCUMENTS

| | | |
|---|---|---|
| TW | 279958 | 7/1996 |
| TW | 201044779 | 12/2010 |

* cited by examiner

*Primary Examiner* — Don Le
(74) *Attorney, Agent, or Firm* — Winston Hsu; Scott Margo

(57) ABSTRACT

The present invention discloses a receiver capable of enhancing accuracy of signal reception. The receiver includes a variable termination resistance unit, coupled to at least one channel, for utilizing at least one termination resistance corresponding to the at least one channel to perform impedance matching, and a signal detection and termination resistance adjustment unit, for detecting at least one external calibration signal corresponding to the at least one channel from at least one external signal generator, and adjusting the at least one termination resistance.

20 Claims, 5 Drawing Sheets

RECEIVER

BACKGROUND OF THE INVENTION

1. Field of the Invention

The present invention relates to a receiver, and more particularly, to a receiver capable of adjusting termination resistance for performing calibration according to a received external calibration signal to enhance accuracy of signal reception.

2. Description of the Prior Art

In general, a termination impedance matching resistor is required in an interface circuit receiver to maintain completeness of a received signal, i.e. when a termination impedance matching resistance of the receiver accurately matches a termination resistance of the transmitter, the accuracy of signal reception can be enhanced.

Please refer to FIG. 1, which illustrates a schematic diagram of a conventional interface circuit receiver 10. As shown in FIG. 1, in many applications, when the interface circuit receiver 10 receives differential signals from a transmitter through channels CH1 and CH2, a termination impedance matching resistor R is required to be disposed in the channels CH1 and CH2 to achieve impedance matching for reducing signal reflection, to enhance accuracy of signal reception.

However, in practical applications, the resistance of the single termination impedance matching resistor R varies with many factors. Therefore, it is hard to realize the termination impedance matching resistor R with a resistance capable of accurately matching with termination resistance of transmitter. Thus, there is a need for improvement of the prior art.

SUMMARY OF THE INVENTION

It is therefore an objective of the present invention to provide a receiver capable of adjusting termination resistance for performing impedance matching according to a received external calibration signal to enhance accuracy of signal reception.

The present invention discloses a receiver, capable of enhancing accuracy of signal reception. The receiver comprises a variable termination resistance unit, coupled to at least one channel, for utilizing at least one termination resistance corresponding to the at least one channel to perform impedance matching, and a signal detection and termination resistance adjustment unit, for detecting at least one external calibration signal corresponding to the at least one channel from at least one external signal generator, and adjusting the at least one termination resistance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
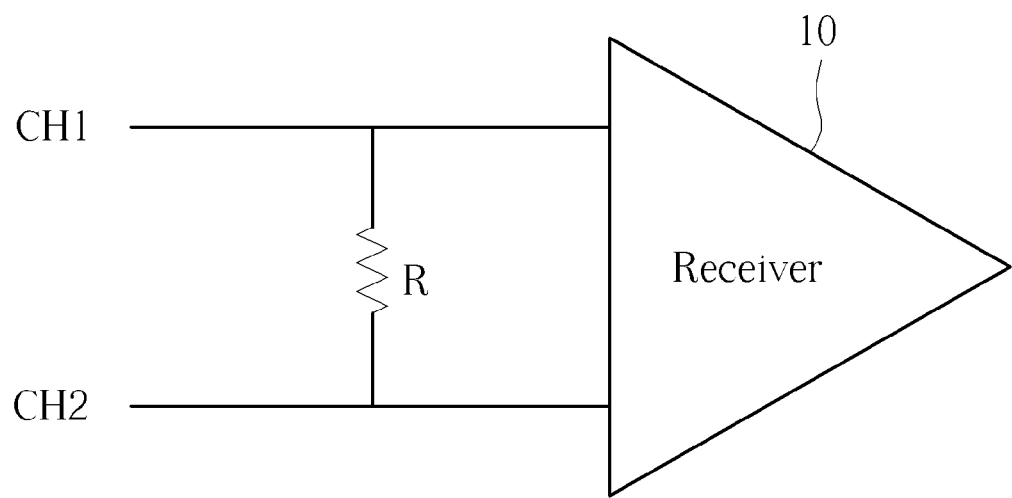
FIG. 1 illustrates a schematic diagram of a conventional interface circuit receiver.
Figure 2:
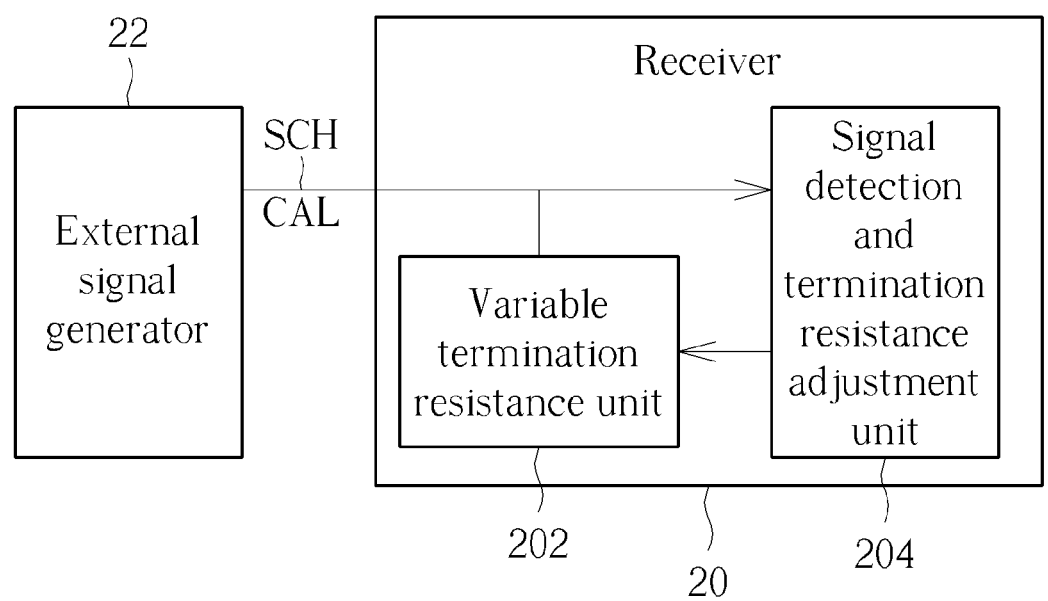
FIG. 2 illustrates a schematic diagram of a receiver according to an embodiment of the invention.

Please refer to FIG. 2, which is a schematic diagram of a receiver 20 according to an embodiment of the invention. As shown in FIG. 2, the receiver 20 is coupled to an external signal generator 22 through a channel SCH, and includes a variable termination resistance unit 202 and a signal detection and termination resistance adjustment unit 204. In short, when the receiver 20 intends to receive signals from the external signal generator 22 through the channel SCH, the receiver 20 first receives an external calibration signal CAL from the external signal generator 22 to perform calibration. At this moment, the variable termination resistance unit 202 coupled to the channel SCH utilizes a current termination resistance corresponding to the channel SCH to perform impedance matching first. Then, the signal detection and termination resistance adjustment unit 204 detects the received external calibration signal CAL based on the current termination resistance corresponding to the channel SCH to adjust the termination resistance corresponding to the channel SCH in the variable termination resistance unit 202 accordingly. In such a condition, the signal detection and termination resistance adjustment unit 204 can adjust the termination resistance corresponding to the channel SCH in the variable termination resistance unit 202 to be substantially equal to the termination resistance of the external signal generator 22 according to accuracy of the received external calibration signal CAL based on the current termination resistance corresponding to the channel SCH, such that the receiver 20 can correctly receive signals from the external signal generator 22 after calibration. As a result, the present invention can adjust the termination resistance corresponding to a channel for performing calibration according to a received external calibration signal through the channel to enhance accuracy of signal reception.

Noticeably, the embodiment in FIG. 2 illustrates that the receiver 20 is coupled to the single external signal generator 22 through the single channel SCH and performs calibration through the single external calibration signal CAL from the external signal generator 22. However, in other embodiments, a quantity of channels, a quantity of external signal generators, and a quantity of external calibration signals are not limited to one, and types of external signal generators are also not limited. Only corresponding modifications and alterations of the receiver 20 are required.

Figure 3:
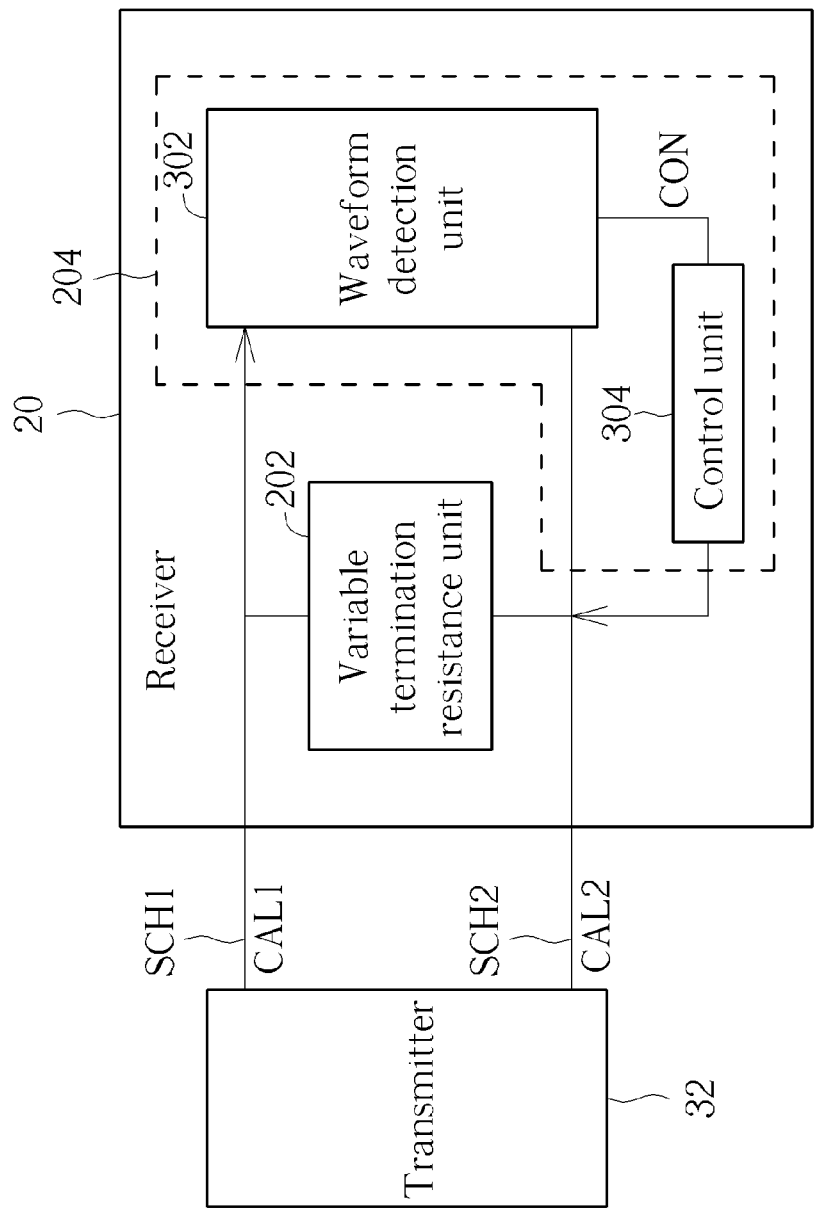
FIG. 3 illustrates a schematic diagram of the receiver in FIG. 2 coupled to a transmitter through two channels.

For example, please refer to FIG. 3, which illustrates a schematic diagram of the receiver 20 in FIG. 2 coupled to a transmitter 32 through channels SCH1 and SCH2. As shown in FIG. 3, the signal detection and termination resistance adjustment unit 204 further includes a waveform detection unit 302 and a control unit 304. In short, in this embodiment, when the receiver 20 intends to receives differential signals from the transmitter 32 through the channels SCH1 and SCH2 (respectively driven by voltage V1 and V2), the receiver 20 receives the external calibration signals CAL1 and CAL2 from the transmitter 32 to perform calibration first. At this moment, the variable termination resistance unit 202 coupled to channels SCH1 and SCH2 first utilizes the current termination resistance corresponding to the channels SCH1 and SCH2 to perform impedance matching. Then, the waveform detection unit 302 detects whether external calibration signals CAL1 and CAL2 based on the current termination resistance corresponding to the channels SCH1 and SCH2 are correct, to generate a control signal CON to the control unit 304. Therefore, the control unit 304 can adjust the respective termination resistance corresponding to the channels SCH1 and SCH2 in the variable termination resistance unit 202 to be substantially equal to the termination resistance of the transmitter 32 according to the control signal CON, such that the receiver 20 can correctly receive differential signals from the transmitter 32 after calibration. Besides, the waveform detection unit 302 generates the control signal CON by detecting whether a period of the external calibration signals CAL1 and CAL2, a frequency of the external calibration signals CAL1 and CAL2, a amplitude of the external calibration signals CAL1 and CAL2, a phase of the external calibration signals CAL1 and CAL2, or other related analog information are correct.

Figure 4:
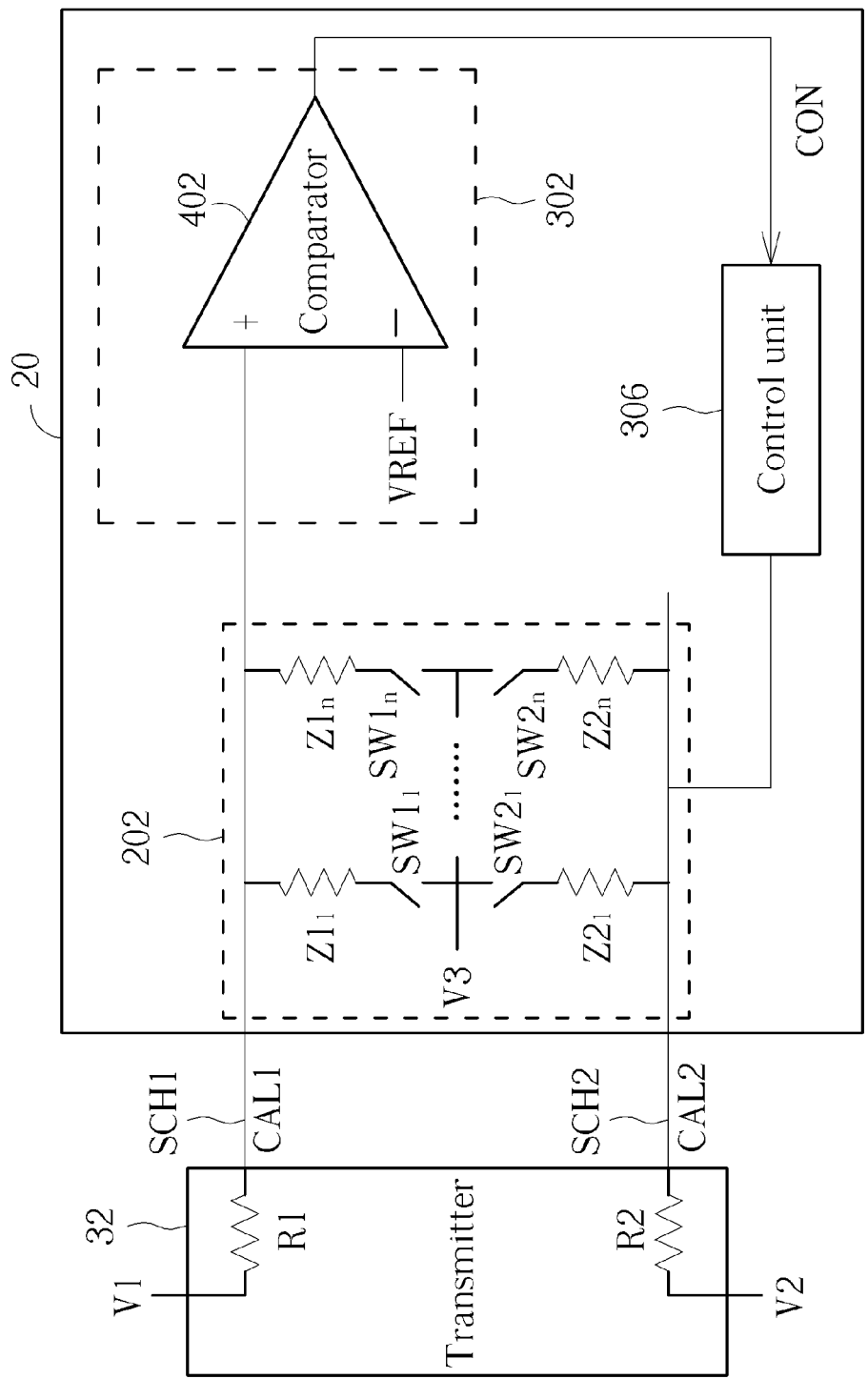
FIG. 4 illustrates a schematic diagram of a detailed circuit of the receiver in FIG. 2.

Specifically, please refer to FIG. 4, which illustrates a schematic diagram of a detailed circuit of the receiver 20 in FIG. 2. As shown in FIG. 4, the variable termination resistance unit 202 includes resistors $Z1_1$~$Z1_n$, resistors $Z2_1$~$Z2_n$, switches $SW1_1$~$SW1_n$, and switches $SW2_1$~$SW2_n$. The waveform detection unit 302 includes a comparator 402. In short, a terminal of each of the resistors $Z1_1$~$Z1_n$ is respectively coupled to the channel SCH1, a terminal of each of the switches $SW1_1$~$SW1_n$ is respectively coupled to the resistors $Z1_1$~$Z1_n$, and another terminal of each of the switches $SW1_1$~$SW1_n$ is respectively coupled to a specific voltage V3. A positive input terminal of the comparator 402 is coupled to the channel SCH1 for receiving the external calibration signal CAL1 and another input terminal of the comparator 402 is coupled to a reference voltage VREF. When the receiver 20 receives the external calibration signal CAL1 from the transmitter 32 to perform calibration, the comparator 402 compares the external calibration signal CAL1 and the reference voltage VREF to generate the control signal CON, such that the control unit 306 can change the quantity of resistors coupled in parallel between the channel SCH1 and the specific voltage V3 among the resistors $Z1_1$~$Z1_n$ to adjust the termination resistance corresponding to the channel SCH1 in the termination resistance adjustment unit 202 according to the control signal CON.

In detail, in the embodiment, the transmitter 32 is a voltage control transmitter, so the transmitter 32 is driven by the voltage V1 to output voltage signals to the channel SCH1. At this moment, the output resistance of the transmitter 32 corresponding to the channel SCH1 is the transmission termination resistance R1 (coupled to the voltage V1) and the voltage of the external calibration signal CAL1 is a division voltage of a voltage of subtracting the specific voltage V3 from the voltage V1 (i.e. the division voltage due to the transmission termination resistance R1 and the resistors coupled in parallel between the channel SCH1 and the specific voltage V3 among the resistors $Z1_1$~$Z1_n$). In such a condition, the reference voltage VREF can be set to be related to a difference of the voltage V1 and the specific voltage V3, e.g. a half of the difference of the voltage V1 and the specific voltage V3. Therefore, when the termination resistance corresponding to the channel SCH1 in the variable termination resistance unit 202 is adjusted to cause a change of voltage level of the external calibration signal CAL1 and to cause a change of state of the control signal CON, the termination resistance of resistors coupled in parallel among the resistors $Z1_1$~$Z1_n$ is substantially equal to the resistance of the transmission termination resistance R1 corresponding to the channel SCH1.

For example, all the switches $SW1_1$~$SW1_n$ can be turned on in the beginning of calibration, such that all the resistors $Z1_1$~$Z1_n$ are coupled in parallel between the channel SCH1 and the specific voltage V3. At this moment, the voltage of the external calibration signal CAL1 is at a minimum value. Next, when the control signal CON indicates that the voltage of the external calibration signal CAL1 is less than the reference voltage VREF, the control unit 306 reduces the quantity of resistors coupled in parallel between the channel SCH1 and the specific voltage V3 among the resistors $Z1_1$~$Z1_n$ to increase the voltage of the external calibration signal CAL1. Then, when the voltage of the external calibration signal CAL1 is increased to be larger than the reference voltage VREF and to cause a change of state of the control signal CON, the termination resistance of resistors coupled in parallel among the resistors $Z1_1$~$Z1_n$ is substantially equal to the resistance of the transmission termination resistance R1 corresponding to the channel SCH1. Therefore, the current status of the switches $SW1_1$~$SW1_n$ can be held and the calibration of the channel SCH1 finishes.

Similarly, when the receiver 20 receives the external calibration signal CAL2 from the transmitter 32 to perform calibration, the positive input terminal of the comparator 402 is coupled to the channel SCH2 for receiving the external calibration signal CAL2. By an adjusting manner similar to the above, the termination resistance of resistors coupled in parallel among the resistors $Z2_1$~$Z2_n$ can be substantially equal to the resistance of the transmission termination resistance R2 corresponding to the channel SCH2. Then, the current status of the switches $SW2_1$~$SW2_n$ can be held and the calibration of the channel SCH2 finishes. Finally, after the receiver 20 finishes the calibration of the termination resistance corresponding to the channels SCH1 and SCH2, the specific voltage V3 can be set to zero, such that the receiver 20 can correctly receive differential signals from the transmitter 32. As a result, the embodiment can adjust the termination resistance accordingly for performing calibration by detecting the voltage (amplitude) of the external calibration signal.

Noticeably, the main spirit of the present invention is adjusting the termination resistance corresponding to a channel for performing calibration according to the external calibration signal received through the channel, to enhance accuracy of signal reception. Those skilled in the art can make modifications or alterations accordingly. For example, a waveform of the external calibration signal can be a clock, a pulse, a sine wave, or other specific waveform. Besides, the above embodiment receives signals from a transmitter through two channels, switches a comparator to be coupled to one of the two channels, and adjusts the two sets of termination resistors coupled in parallel corresponding to the two channels to perform calibration. However, in other embodiment, the quantity of channels, the quantity of transmitters, the quantity of resistors coupled in parallel, and the quantity of comparators can be other numbers according to practical requirement (for example, signals are received from a transmitter through a channel or from respective transmitters through respective channels). Moreover, in the above embodiment, the resistors $Z1_1$~$Z1_n$ are all coupled in parallel between the channel SCH1 and the specific voltage V3 in the beginning of calibration. Then, the voltage of the external calibration signal is increased by reducing the quantity of resistors coupled in parallel between the channel SCH1 and the specific voltage V3 among the resistors $Z1_1$~$Z1_n$ to cause a change of state of the control signal and to determine the calibration finishes. However, in other embodiment, only one of the resistors $Z1_1$~$Z1_n$ is coupled in parallel between the channel SCH1 and the specific voltage V3 in the beginning of calibration. Then, the voltage of the external calibration signal is decreased by increasing the quantity of resistors coupled in parallel between the channel SCH1 and the specific V3 among the resistors $Z1_1$~$Z1_n$ to cause a change of state of the control signal CON and to determine the calibration finishes. In addition, in the above embodiment, the transmitter 32 is a voltage control transmitter. However, in other embodiment, the transmitter 32 can also be other types of transmitter and is not limited herein.

Figure 5:
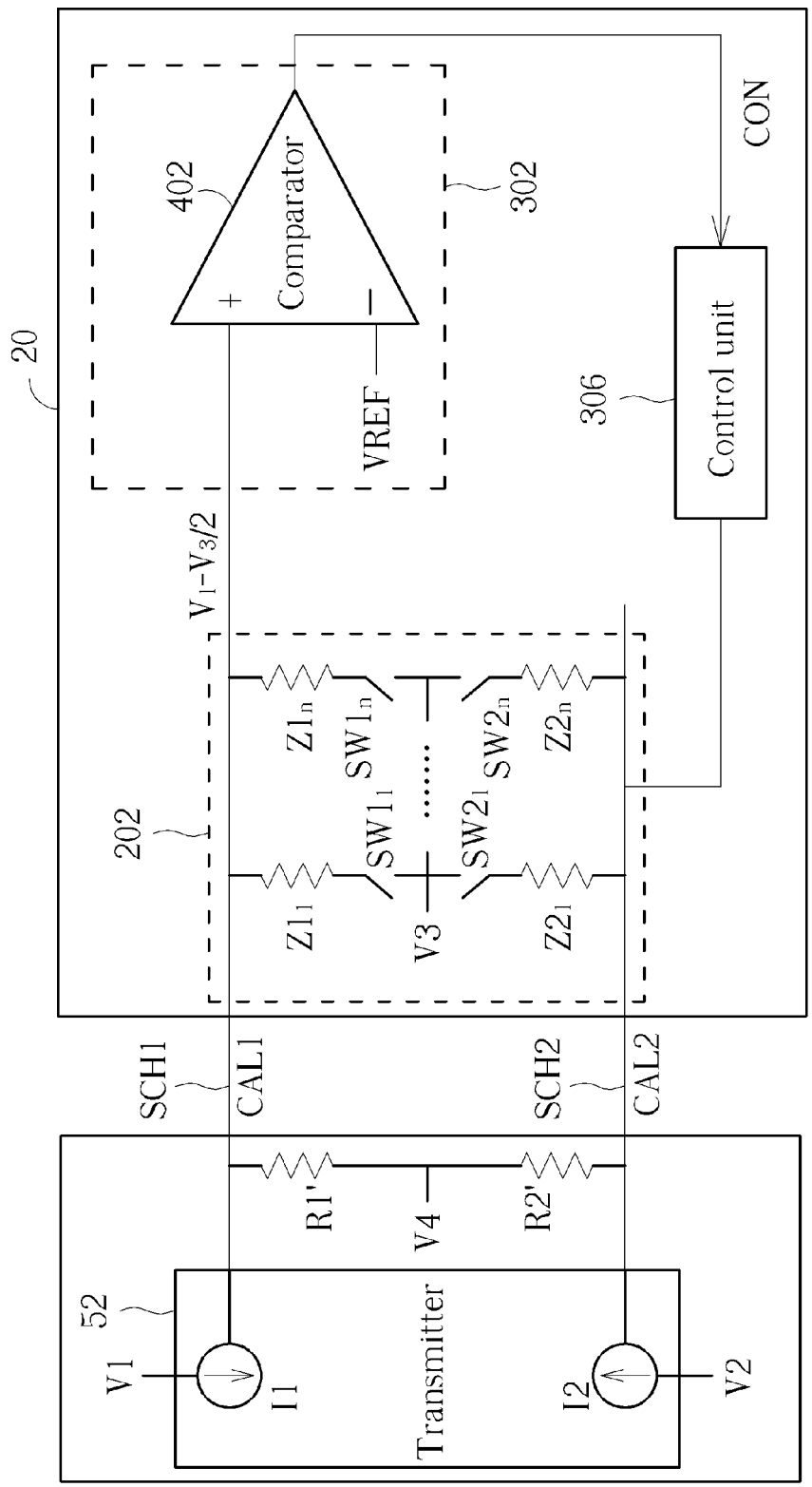
FIG. 5 illustrates a schematic diagram of the receiver in FIG. 2 receiving signals from a current control transmitter.

For example, please refer to FIG. 5, which illustrates a schematic diagram of the receiver 20 in FIG. 4 receiving signals from a current control transmitter 52. The receiver 20 in FIG. 5 and the receiver 20 in FIG. 4 are identical. The difference between FIG. 5 and FIG. 4 is that the transmitter 52 shown in FIG. 5 is a current control transmitter. Therefore, during normal data transmission, the transmitter 52 is driven by the voltage V1 to output a current I1 to the channel SCH1 and then the current I1 flows through the transmission termination resistance R1' and the resistors coupled in parallel between the channel SCH1 and the specific voltage V3 among the resistors $Z1_1 \sim Z1_n$, to generate signals. In such a condition, during calibration, the transmission termination resistance R1' is coupled to a specific voltage V4. At this moment, the voltage of the external calibration signal CAL1 is a division voltage of a voltage of subtracting the specific voltage V3 from the specific voltage V4 (i.e. the division voltage due to the transmission termination resistance R1' and the resistors coupled in parallel between the channel SCH1 and the specific voltage V3 among the resistors $Z1_1 \sim Z1_n$). At this moment, the reference voltage VREF can be set to be related to a difference between the voltage V4 and the specific voltage V3, e.g. a half of the difference between the voltage V4 and the specific voltage V3. As a result, the termination resistance of resistors coupled in parallel among the resistors $Z1_1 \sim Z1_n$ is adjusted to be substantially equal to the resistance of the transmission termination resistance R1' corresponding to the channel SCH1 for performing calibration. By the same token, the termination resistance of resistors coupled in parallel among the resistors $Z2_1 \sim Z2_n$ is adjusted to be substantially equal to the resistance of the transmission resistance R2' corresponding to the channel SCH2 for performing calibration. Finally, after the receiver 20 finishes the calibration of the termination resistance corresponding to the channels SCH1 and SCH2, the specific voltage V3 and V4 can be set to zero, As a result, the current I1 outputted to the channel SCH1 by the transmitter 52, which is driven by the voltage V1 during normal data transmission, can equally flow to the transmission termination resistance R1' and the resistors coupled in parallel between the channel SCH1 and the specific voltage V3 among the resistors $Z1_1 \sim Z1_n$, and the current I2 outputted to the channel SCH2 by the transmitter 52, which is driven by the voltage V2 during normal data transmission, can equally flow to the transmission termination resistance R2' and the resistors coupled in parallel between the channel SCH2 and the specific voltage V3 among the resistors $Z2_1 \sim Z2_n$, such that the receiver 20 can correctly receive differential signals from the transmitter 52.

In the prior art, the resistance of the single termination impedance matching resistor R varies with many factors. Therefore, it is hard to realize the termination impedance matching resistor R with a resistance capable of accurately matching with termination resistance of transmitter. In comparison, the present invention can adjust termination resistance for performing calibration according to the received external calibration signal to enhance accuracy of signal reception.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver, capable of enhancing accuracy of signal reception, comprising:
   a variable termination resistance unit, coupled to at least one channel, for utilizing at least one termination resistance corresponding to the at least one channel to perform impedance matching; and
   a signal detection and termination resistance adjustment unit, for detecting at least one external calibration signal corresponding to the at least one channel from at least one external signal generator, and adjusting the at least one termination resistance;
   wherein the at least one external signal generator comprises a transmitter.

2. The receiver of claim 1, wherein the signal detection and termination resistance adjustment unit comprises:
   at least one waveform detection unit, for detecting whether the at least one external calibration signal is correct to generate at least one control signal; and
   a control unit, for adjusting the at least one termination resistance corresponding to the at least one channel in the termination resistance adjustment unit according to the at least one control signal.

3. The receiver of claim 2, wherein the at least one waveform detection unit detects whether a period of the at least one external calibration signal, a frequency of the at least one external calibration signal, an amplitude of the at least one external calibration signal, or a phase of the at least one external calibration signal is correct to generate the at least one control signal.

4. The receiver of claim 2, wherein the variable termination resistance unit comprises:
   a plurality of first resistors, a terminal of the plurality of first resistors coupled to a first channel of the at least one channel; and
   a plurality of first switches, a terminal of the plurality of first switches coupled to the plurality of first resistors and another terminal of the plurality of first switches coupled to a first specific voltage;
   wherein the control unit adjusts a quantity of first resistors coupled in parallel between the first channel and the first specific voltage among the plurality of first resistors according to a first control signal of the at least one control signal.

5. The receiver of claim 4, wherein the at least one waveform detection unit comprises:
   a comparator, comprising an input terminal coupled to the first channel for receiving a first external calibration signal of the at least one external calibration signal, and another input terminal coupled to a reference voltage, for comparing the first external calibration signal and the reference voltage to generate the first control signal.

6. The receiver of claim 5, wherein the reference voltage is related to a difference of a second specific voltage coupled to a transmission termination resistance and the first specific voltage.

7. The receiver of claim 5, wherein the control unit reduces the quantity of the first resistors coupled in parallel between the first channel and the first specific voltage among the plurality of the first resistor when the first control signal indicates a voltage of the first external calibration signal is less than the reference voltage.

8. The receiver of claim 5, wherein a first termination resistance of the first resistors coupled in parallel among the plurality of the first resistor is substantially equal to a transmission termination resistance corresponding to the first channel at a change of state of the first control signal.

9. The receiver of claim 1, wherein the transmitter is a voltage control transmitter.

10. The receiver of claim 1, wherein the transmitter is a current control transmitter.

11. A receiver, capable of enhancing accuracy of signal reception, comprising:
- a variable termination resistance unit, coupled to at least one channel, for utilizing at least one termination resistance corresponding to the at least one channel to perform impedance matching; and
- a signal detection and termination resistance adjustment unit, for detecting at least one external calibration signal corresponding to the at least one channel from at least one external signal generator, and adjusting the at least one termination resistance;
- wherein the signal detection and termination resistance adjustment unit comprises:
  - at least one waveform detection unit, for detecting whether the at least one external calibration signal is correct to generate at least one control signal; and
  - a control unit, for adjusting the at least one termination resistance corresponding to the at least one channel in the termination resistance adjustment unit according to the at least one control signal.

12. The receiver of claim 11, wherein the at least one external signal generator comprises a transmitter.

13. The receiver of claim 11, wherein the at least one waveform detection unit detects whether a period of the at least one external calibration signal, a frequency of the at least one external calibration signal, an amplitude of the at least one external calibration signal, or a phase of the at least one external calibration signal is correct to generate the at least one control signal.

14. The receiver of claim 11, wherein the variable termination resistance unit comprises:
- a plurality of first resistors, a terminal of the plurality of first resistors coupled to a first channel of the at least one channel; and
- a plurality of first switches, a terminal of the plurality of first switches coupled to the plurality of first resistors and another terminal of the plurality of first switches coupled to a first specific voltage;
- wherein the control unit adjusts a quantity of first resistors coupled in parallel between the first channel and the first specific voltage among the plurality of first resistors according to a first control signal of the at least one control signal.

15. The receiver of claim 14, wherein the at least one waveform detection unit comprises:
- a comparator, comprising an input terminal coupled to the first channel for receiving a first external calibration signal of the at least one external calibration signal, and another input terminal coupled to a reference voltage, for comparing the first external calibration signal and the reference voltage to generate the first control signal.

16. The receiver of claim 15, wherein the reference voltage is related to a difference of a second specific voltage coupled to a transmission termination resistance and the first specific voltage.

17. The receiver of claim 15, wherein the control unit reduces the quantity of the first resistors coupled in parallel between the first channel and the first specific voltage among the plurality of the first resistor when the first control signal indicates a voltage of the first external calibration signal is less than the reference voltage.

18. The receiver of claim 15, wherein a first termination resistance of the first resistors coupled in parallel among the plurality of the first resistor is substantially equal to a transmission termination resistance corresponding to the first channel at a change of state of the first control signal.

19. The receiver of claim 12, wherein the transmitter is a voltage control transmitter.

20. The receiver of claim 12, wherein the transmitter is a current control transmitter.

* * * * *